Oct. 15, 1940.  H. GOOSKENS  2,218,381
THERMIONIC CATHODE
Filed Aug. 17, 1937
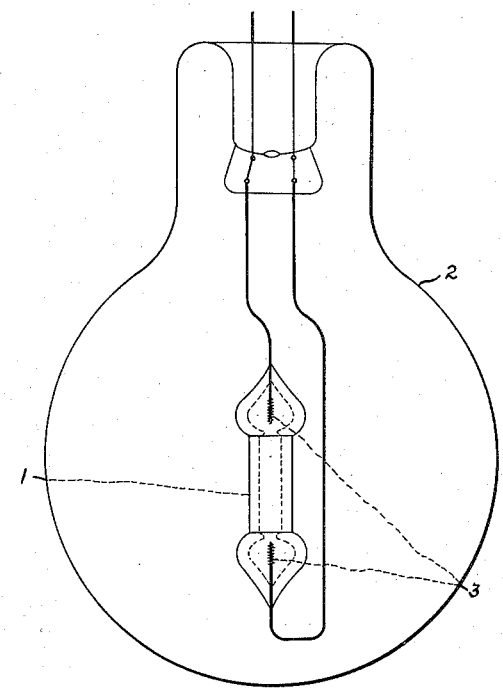
Inventor:
Henricus Gooskens,
by Harry E. Dunham
His Attorney Patented Oct. 15, 1940

2,218,381

UNITED STATES PATENT OFFICE 2,218,381

THERMIONIC CATHODE

Henricus Gooskens, Eindhoven, Netherlands, assignor to General Electric Company, a corporation of New York Application August 17, 1937, Serial No. 159,595
In Germany September 3, 1936

5 Claims. (Cl. 176—126)

The present invention relates to improvements in thermionic cathodes.

It is an object of the invention to provide an emitting substance which is strongly resistant to high temperatures in the sense of having a low rate of evaporation when exposed to such temperatures.

This object is attained by utilizing as an emitter a glass-like substance comprising a multiple oxide having a very high boiling point, say above 2,000 degs. C. According to a preferred embodiment of the invention, I may combine for this purpose a basic component comprising one or more oxides of the group consisting of thorium, zirconium, beryllium and lanthanum with an acid component comprising one or more oxides of the group consisting of silicon and aluminum. In the selected combination the basic component should be present in excess so that in the case of the thorium-silicon combination, for example, the formula of the emitting substance may be represented as $XThO_2$—$SiO_2$, where X represents a number greater than 1. (When speaking of an acid or basic component I imply that the component is acid or basic with respect to the other component.)

It is not only desirable to have the boiling point of the emitting substance as a whole above 2,000 degs. C. but it is also advisable that the basic component have a still higher boiling point, say above 3,000 degs. C. in order that selective evaporation of the surplus of this component may be prevented. All of the basic components enumerated in the preceding paragraph fulfill this requirement. When using several basic components, as is advantageous in some cases, only very slight evaporation occurs when only one of the basic substances has a boiling point above 3,000 degs. C.

Emitting substances constituted as described in the foregoing assume a glass-like quality when subjected to high temperatures, a silicate being formed when silica is used as the acid component, and an aluminate when aluminum oxide is employed. Tests have shown that electrodes constructed in accordance with the invention are highly resistant to high temperatures and evaporate only very slightly, so that a long electrode life is obtained. Their electron emissivity may advantageously be increased in some instances by the addition of an alkaline earth material, for example, barium or strontium oxide. These latter combine with the acid component of the emitting substance and form therewith a silicate or aluminate as the case may be.

The utility of the invention may best be explained in connection with the single figure of the attached drawing, which represents a mercury-vapor discharge device 1 surrounded by an enclosing envelope 2, the device being of the type in which a mercury pressure in excess of 5 atmospheres occurs during normal operation. At such pressures, the discharge may be concentrated on relatively small portions of the discharge electrodes which are represented at 3 so that there is a strong tendency for the electrode material to be vaporized. This difficulty may be overcome by forming the electrodes of overwound tungsten or a similar refractory base material to which is applied a layer of emitting material of the type hereinbefore described. One example of such emitting material may be prepared and applied as indicated in the following:

100 grams thorium oxide, 35 grams of a mixture of barium carbonate and strontium carbonate, 165 cc. of a 3% solution of cellulose in amyl acetate, and 165 cc. amyl acetate are mixed together and finely ground. To this mixture 22 grams of finely ground quartz ($SiO_2$) are added and the mixture is again ground. From the paste which is obtained in this manner, an even thin layer is applied to the tungsten core and the electrodes are heated in a reducing atmosphere, for instance in a nitrogen-hydrogen mixture. The elements may be maintained at a very high temperautre, (for instance 2,000 degs. C.) until sintering takes place and a fused glass-like mass is obtained on the electrode. The substance resulting from the heating step may be conveniently referred to as the "fusion product" of the oxides employed. After this, the electrode may be introduced in the discharge tube and the latter may be then completed. With such electrodes, a life of several thousand hours may be attained without the emitting material evaporating considerably.

While I have described particular embodiments of the invention, numerous modifications thereof may be made by those skilled in the art without departing from the invention. I therefore aim in the appended claims to cover all such equivalent variations as fall within the true spirit and scope of the foregoing disclosure.

What I claim as new and desire to secure by Letters Patent of the United States is:

1. A thermionic cathode comprising a coating of a glass-like emitting substance which includes the fusion product of a basic component comprising one or more oxides of the group consisting of thorium, zirconium, beryllium and lanthanum with an acid component comprising one or more oxides of the group consisting of silicon and aluminum.

2. A thermionic cathode comprising an exposed discharge-receiving surface coated with a glass-like emitting substance constituted of the fusion product of a basic component comprising one or more oxides of the group consisting of thorium, zirconium, beryllium or lanthanum with an acid component comprising one or more oxides of the group consisting of silicon and aluminum, the basic component being present in excess.

3. A cathode according to claim 2 characterized by the fact that the emitting substance also includes alkaline earth material.

4. A thermionic cathode comprising an exposed discharge-receiving surface coated with a glass-like emitting substance, said substance including the fusion product of a multiple oxide of thorium and silicon, the thorium component being present in excess.

5. A thermionic cathode having an exposed discharge-receiving surface which is coated with a temperature-resistant emitting substance, said substance including the fusion product of the oxides of thorium and silicon and further including a quantity of alkaline earth material.

HENRICUS GOOSKENS.